US012780471B2

(12) United States Patent
Canberi

(10) Patent No.: US 12,780,471 B2
(45) Date of Patent: Nov. 3, 2026

(54) ANTI-DRIP NOZZLE SYSTEM

(71) Applicant: ROBOTEK OTOMASYON TEKNOLOJILERI SANAYI TICARET LIMITED SIRKETI, Cayirova (TR)

(72) Inventor: Osman Canberi, Cayirova (TR)

(73) Assignee: ROBOTEK OTOMASYON TEKNOLOJILERI SANAYI TICARET LIMITED SIRKETI (TR)

( * ) Notice: Subject to any disclaimer, the term of this patent is extended or adjusted under 35 U.S.C. 154(b) by 0 days.

(21) Appl. No.: 19/103,555

(22) PCT Filed: Aug. 10, 2023

(86) PCT No.: PCT/TR2023/050796
§ 371 (c)(1),
(2) Date: Feb. 13, 2025

(87) PCT Pub. No.: WO2024/039338
PCT Pub. Date: Feb. 22, 2024

(65) Prior Publication Data

US 2026/0048885 A1 Feb. 19, 2026

(30) Foreign Application Priority Data

Aug. 17, 2022 (TR) ............................... 2022/013034

(51) Int. Cl.
*B65B 39/00* (2006.01)
*B67C 3/26* (2006.01)

(52) U.S. Cl.
CPC .......... *B65B 39/004* (2013.01); *B67C 3/2608* (2013.01)

(58) Field of Classification Search
CPC ..... B65B 39/004; B67C 3/2608; B05B 1/306; B05B 11/1039
See application file for complete search history.

(56) References Cited

U.S. PATENT DOCUMENTS 5,255,720 A * 10/1993 McPherson ........... B67C 3/2608 141/89
2004/0149784 A1* 8/2004 Solignac ................... B67C 3/26 222/518

FOREIGN PATENT DOCUMENTS

CN 102923630 B 2/2015

* cited by examiner

*Primary Examiner* — Jason K Niesz

(57) ABSTRACT

The invention is an anti-drip nozzle system (1) that, through the movement of the piston (11), enables the plug (17) to press against the seat ring (19), thereby closing the flow line (20) and stopping the flow of the fluid from the nozzle. Conversely, when the plug (17) is retracted, it opens the flow line (20), allowing the fluid to flow from the nozzle.

14 Claims, 5 Drawing Sheets

ANTI-DRIP NOZZLE SYSTEM

TECHNICAL FIELD

The invention relates to a system that prevents dripping in dosing, dispensing, and filling mechanisms used in various industries, by opening and closing the flow line near the tip of the nozzle.

The invention is an anti-drip nozzle system that, through the movement of the piston, enables the plug to press against the seat ring, thereby closing the flow line and stopping the flow of the fluid from the nozzle. Conversely, when the plug is retracted, it opens the flow line, allowing the fluid to flow from the nozzle.

PRIOR ART

In dispensing and filling processes, it is necessary to dispense the desired amount of fluid onto or into the workpiece, ensuring that the fluid does not uncontrollably drip outside the targeted area or onto the production line before or after dispensing. In order to perform dispensing or filling into the recessed surfaces or volumes of the workpieces, the use of long nozzles is required. However, when using long nozzles for dispensing or filling, the fluid inside the nozzle can drip uncontrollably before or after the dispensing process. These uncontrolled drips can render the workpieces unusable depending on the nature of the dispensed or filled fluid. In addition, uncontrolled dripping can cause damage to production lines and disrupt production. Therefore, there is a need for a nozzle system that can prevent uncontrolled dripping by closing the flow line near the tip of the nozzle, while being suitable for mass production and automation. Although there are existing patents related to this issue, our invention is fundamentally different and unique in its structure.

The patent document CN102923630B discloses a drip prevention system where the movement of the piston enables the opening and closing of the nozzle. In this system, the movement of the piston is achieved by directing the fluid to be dispensed from the nozzle into the piston, where the force generated by the pressure of the fluid overcomes the force of the spring behind the piston, without the need for external control input. However, in present invention, the movement of the piston is controlled by externally controlled compressed air. The mentioned patent document discloses the fluid inlet is on the side, without a mixing chamber in the system, and the direction of the fluid changes by 90 degrees after the inlet point. In present invention, the fluid coming from the mixing chamber moves along a straight flow line without changing its direction and exits from the nozzle tip. Additionally, the solution presented in the mentioned patent document does not discloses an anti-drip system with a long nozzle, which can be automated with an external control, suitable for serial dispensing and filling processes.

OBJECT AND SUMMARY OF THE INVENTION

The object of the invention is to enable the dispensing of the desired amount of fluid onto or into the workpiece during dispensing and filling processes, while preventing uncontrolled dripping of the fluid outside the targeted area on the workpiece or onto the production line before or after dispensing. This is achieved by opening and closing the flow line near the tip of the nozzle.

Another object of the invention is to provide an anti-drip nozzle system that is suitable for serial production and automation.

REFERENCE NUMBERS

Figure 1:
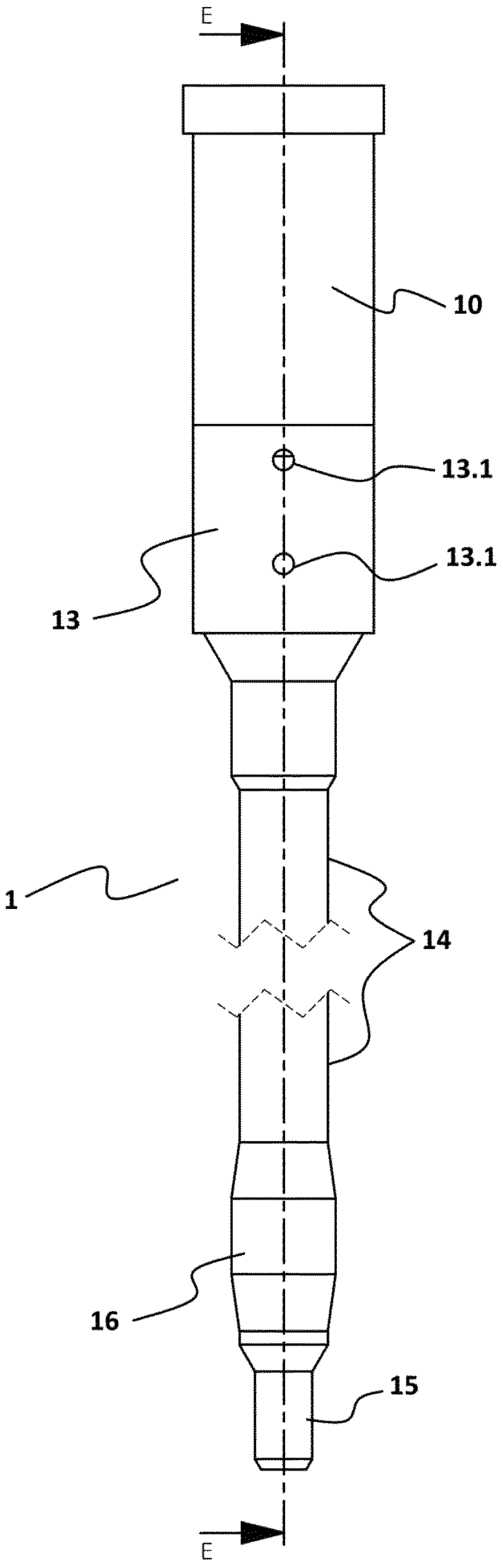
FIG. 1 shows an external view of the anti-drip nozzle system.
Figure 2:
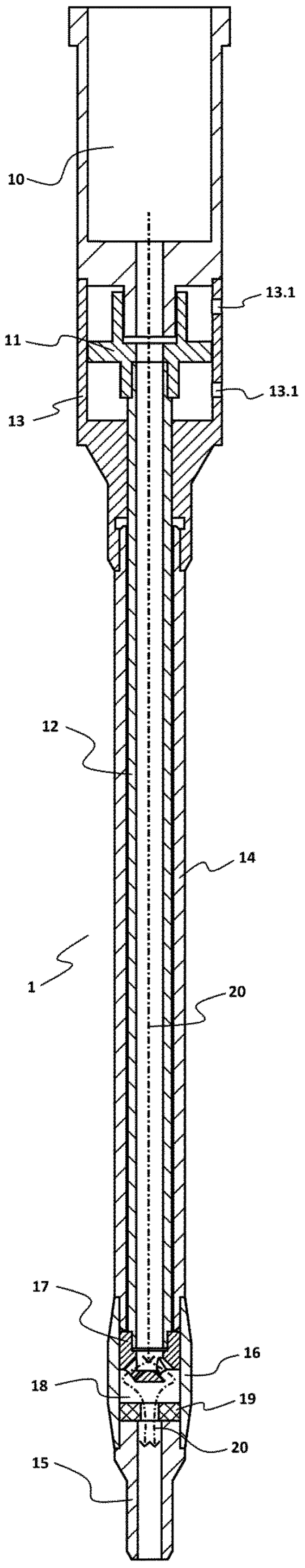
FIG. 2 shows a cross-sectional view (E-E section) of the anti-drip nozzle system with the plug in the retracted position.
Figure 3:
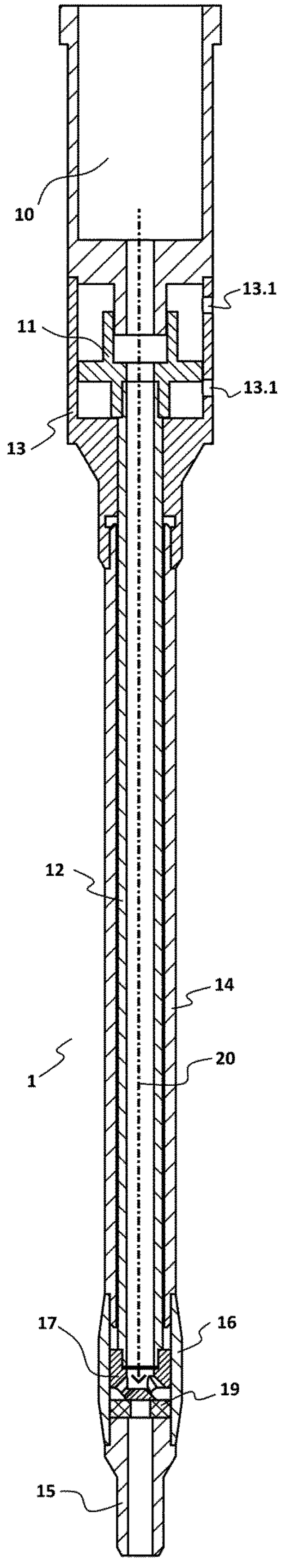
FIG. 3 shows a cross-sectional view (E-E section) of the anti-drip nozzle system with the plug in the extended position.
Figure 4:
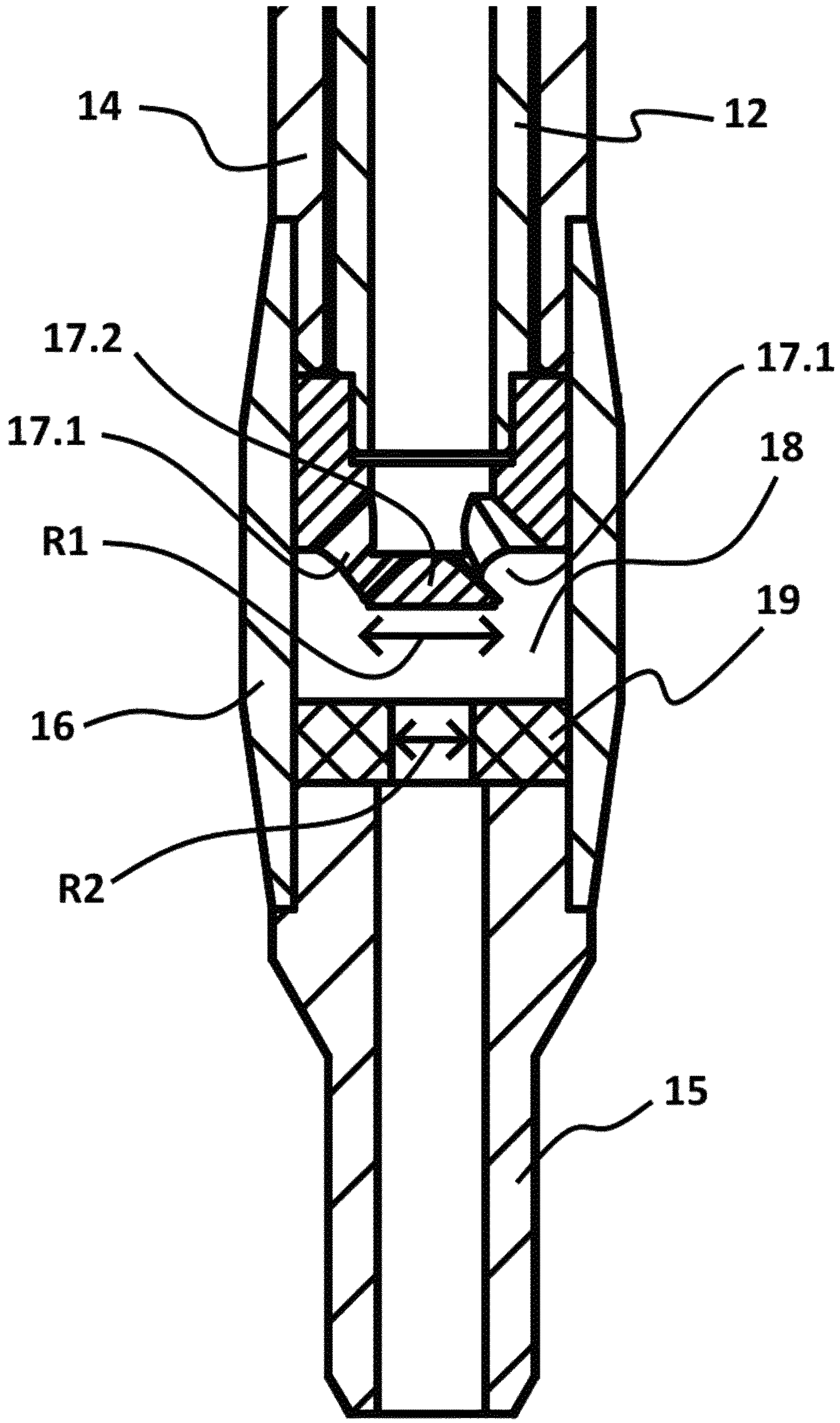
FIG. 4 shows a close-up cross-sectional view (E-E section) of the anti-drip nozzle system with the plug in the retracted position.
Figure 5:
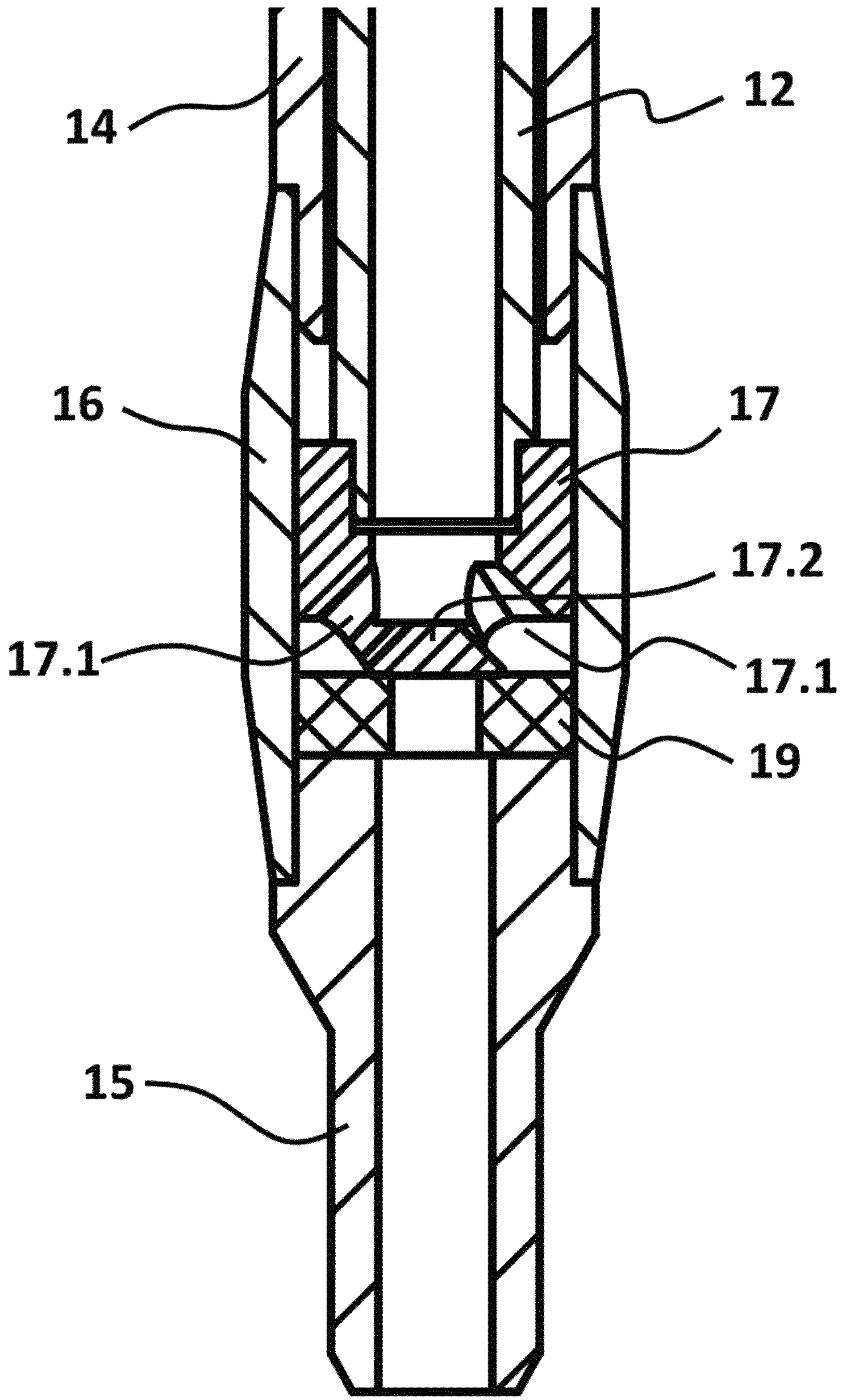
FIG. 5 shows a close-up cross-sectional view (E-E section) of the anti-drip nozzle system with the plug in the extended position.

1 Anti-drip nozzle system
10 Mixing chamber
11 Piston
12 Piston tube
13 Cylinder
13.1 Compressed air inlet/outlet
14 Body tube
15 Nozzle tip
16 Nozzle tip adapter
17 Plug
17.1 Plug slot
17.2 Plug face
18 Gap
19 Seat ring
20 Flow line
R1 Plug face diameter
R2 Seat ring inner diameter

DETAILED DESCRIPTION OF THE INVENTION

The invention relates to an anti-drip nozzle system (1) that provides the function of closing the flow line (20) passing through the plug slot (17.1) and stopping the material flow as a result of the plug (17) at the end of the piston (11) pressing the seat ring (19) with the movement of the piston (11). Conversely, opening the flow line (20) passing through the plug slot (17.1) and starting the material flow from the nozzle tip (15) as a result of the plug (17) at the end of the piston (11) being separated from the seat ring (19) by pulling back the piston (11).

The anti-drip nozzle system (1) of the invention primarily comprises; at least one mixing chamber (10) that accommodates the fluid to be dispensed or filled, a piston (11) connected to said mixing chamber (10), at least one cylinder (13) surrounding the piston (11), at least one piston tube (12) connected to the piston (11), at least one compressed air inlet/outlet (13.1) in the said cylinder (13), at least one body tube (14) preferably connected to the said cylinder (13), followed by at least one nozzle tip adapter (16) preferably connected to the said body tube (14), followed by at least one nozzle tip (15) preferably connected to the nozzle tip adapter (16), and at least one plug (17) preferably connected to the end portion of the said piston tube (12).

The mentioned mixing chamber (10) is preferably designed with a cylinder geometry and serves to supply the nozzle system with the fluid it contains. Alternatively, the nozzle system can be fed through a continuous or intermittent flow connection instead of the mixing chamber (10).

The mentioned cylinder (13), preferably connected to the mixing chamber (10) in continuation and typically having a cylindrical geometry, includes at least one compressed air inlet/outlet (13.1) and at least one piston (11) within it.

The mentioned piston (11) is positioned inside the cylinder (13) to move forward and backward. At the end of the said piston (11), preferably connected to the piston (11), there is preferably at least one piston tube (12) preferably with cylindrical geometry, through which the fluid will flow.

The said piston tube (12) comprises at least one plug (17) preferably with cylindrical geometry, preferably connected to its end. The said plug (17), which has at least one plug slot (17.1) through which the fluid will flow, comprises at least one plug face (17.2), preferably having a flat or conical geometry, which closes the flow line (20) by pressing the seat ring (19). In addition, a gap (18) is formed between the plug (17) and the seat ring (19) by retracting the plug (17) so that the fluid coming from the plug slot (17.1) passes through the seat ring (19) and reaches the nozzle tip (15). The said seat ring (19), through which the fluid passes, is preferably made of a non-metallic material and preferably with a cylindrical geometry and is preferably placed on the nozzle tip (15). The body tube (14), preferably with a cylindrical geometry, is preferably connected to the cylinder (13) and is outside the piston tube (12) and extends to the nozzle tip adapter (16). The said nozzle tip adapter (16), preferably has a cylindrical geometry, connects the nozzle tip (15) to the body tube (14). However, the nozzle tip (15) can be directly connected to the body tube (14) instead of using the nozzle tip adapter (16).

The fluid in the mixing chamber (10) passes through the flow line (20) formed by the piston tube (12), the plug slot (17.1), the gap (18), the seat ring (19) and the nozzle tip (15) respectively. The compressed air sent from the compressed air inlet/outlets (13.1) on the cylinder (13) enables the forward-backward movement of the piston (11) inside the cylinder (13). When the piston (11) is retracted, the plug (17) connected to the piston tube (12) separates from the seat ring (19) and opens the flow line (20). In this case, the fluid coming from the mixing chamber (10) passes through the flow line (20) formed by the gap (18) in the middle of the piston (11), the piston tube (12), the plug slot (17.1) on the plug (17), the gap (18) in the nozzle tip adapter (16), the seat ring (19) and the nozzle tip (15) and is dispensed into the desired location.

With the forward movement of the piston (11), the plug (17) connected to the piston tube (12) presses the seat ring (19) cuts off the flow line (20). In order to cut off the flow line (20) and ensure sealing, the plug face diameter (R1) must be larger than or equal to the seat ring inner diameter (R2). Additionally, the plug (17) and the seat ring (19) can have a conical shape. In this way, the plug face (17.2) or the conical surface of the plug (17) closes the seat ring (19) in such a way that there is no gap, as a result of this, passing the fluid, coming from the previous parts of the flow line (20), passing through the seat ring (19) to the nozzle tip (15) is prevented.

Here, it is also possible for the plug face (17.2) to close the flow line (20) by pressing the upper part of the nozzle tip (15) instead of the seat ring (19). By closing the flow line (20) near the nozzle tip (15), uncontrolled dripping of the fluid after dispensing and filling processes is prevented. The forward and backward movement of the piston (11) is preferably achieved through compressed air. However, it can also be accomplished using a hydraulic system or an electric motor. Furthermore, in the present invention, the opening and closing operation of the flow line (20) can be performed manually as well as by automation. This enables more efficient use of dispensed and filled materials and allows for serial production in dispensing and filling processes.

The description of an embodiment illustrating the use of the described anti-drip nozzle system (1) in the specification is provided for ease of understanding, but it should be noted that present invention is not limited solely to this application and can be clearly seen by a person skilled in the art. Furthermore, the terms "forward" and "backward" used in the description are based on the orientation or positional relationships depicted in the figures and are solely used for the clarity and ease of description of the technical solution. Therefore, they should not be understood as a limitation of the present disclosure.

What is claimed is:

1. An anti-drip nozzle system (1) that prevents dripping by opening and closing a flow line (20) near a nozzle tip (15), the anti-drip nozzle system (1) is configured to prevent uncontrolled dripping, enable automated serial filling and dispensing, and allow for the opening and closing of the flow line (20) near the nozzle tip (15) through the movement of a piston (11), the anti-drip nozzle system (1) comprising:

a piston tube (12) connected to the piston (11), wherein a fluid passes through the piston tube (12);

a plug (17) is connected to an end of the piston tube (12), wherein the plug (17) comprising at least one plug slot (17.1) and at least one plug face (17.2), wherein the fluid passing through the piston tube (12) passes through the plug slot (17.1); and a seat ring (19), wherein the movement of the piston (11) enables the plug face (17.2) to press against and lift off from the seat ring (19) to open and close the flow line (20).

2. The anti-drip nozzle system (1) according to claim 1, comprising at least one seat ring (19) that, as a result of the movement of the plug (17) and seating on the plug face (17.2), allows for the opening and closing of the flow line (20).

3. The anti-drip nozzle system (1) according to claim 1, wherein to cut off the flow line (20) and ensure sealing, a plug face diameter (R1) is larger than the inside diameter of the seat ring (19), or both diameters are equal, or the plug (17) and the seat ring (19) are conical in shape.

4. The anti-drip nozzle system (1) according to claim 1, wherein the flow line (20) comprises of the following components through which the fluid to be filled passes respectively: a mixing chamber (10), the piston (11), the piston tube (12), the plug (17), the plug slot (17.1), the gap (18), the seat ring (19), and the nozzle tip (15).

5. The anti-drip nozzle system (1) according to claim 1, wherein the system (1) comprising the plug face (17.2) is configured to provide a seal by pressing against a surface of the nozzle tip (15) proximal to the seat ring (19).

6. The anti-drip nozzle system (1) according to claim 1, comprising at least one gap (18) through which the fluid from previous sections of the flow line (20) passes through the seat ring (19) to reach the nozzle tip (15), wherein the gap (18) is created between the plug (17) and the seat ring (19) when the plug (17) is retracted for the fluid to flow.

7. The anti-drip nozzle system (1) according to claim 6, wherein the gap (18) is located between a lower part of the plug slot (17.1) and an upper part of the seat ring (19), and wherein a size of the gap (18) varies according to axial displacement of the piston (11).

8. The anti-drip nozzle system (1) according to claim 1, comprising at least one nozzle tip adapter (16) that connects the nozzle tip (15) and a body tube (14) with each other.

9. The anti-drop nozzle system (1) according to claim 8, wherein the flow line (20) extends through the nozzle tip adapter (16) from the body tube (14) to the nozzle tip (15) such that the plug face (17.2) presses against the seat ring (19) at the nozzle tip (15) to close the flow line (20).

10. The anti-drip nozzle system (1) according to claim 1, the system (1) comprises:

at least one mixing chamber (10) that accommodates the fluid.

11. The anti-drip nozzle system (1) according to claim 10, wherein the fluid from the mixing chamber (10) passes through the piston tube (12) until it reaches the plug slot (17.1).

12. The anti-drip nozzle system (1) according to claim 1, wherein to provide movement of the piston tube (12) and the plug (17), the system (1) comprises:

at least one cylinder (13) in which the piston (11) moves, and at least one piston (11) placed in the said cylinder (13).

13. The anti-drip nozzle system (1) according to claim 12, wherein, in order to provide movement of the piston (11), the system (1) comprises:

at least one compressed air inlet/outlet (13.1) on the cylinder (13), wherein compressed air is supplied through the compressed air inlet/outlet (13.1), and the compressed air actuates the piston (11) to control opening and closing of the flow line (20).

14. The anti-drop nozzle system (1) according to claim 13, wherein the piston (11) is axially movable within the cylinder (13) in a direction parallel to the flow line (20).

* * * * *